United States Patent
Schuh

(10) Patent No.: US 10,402,647 B2
(45) Date of Patent: Sep. 3, 2019

(54) ADAPTED USER INTERFACE FOR SURFACING CONTEXTUAL ANALYSIS OF CONTENT

(71) Applicant: Microsoft Technology Licensing, LLC, Redmond, WA (US)

(72) Inventor: Eric Schuh, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/597,905

(22) Filed: May 17, 2017

(65) Prior Publication Data

US 2018/0336411 A1   Nov. 22, 2018

(51) Int. Cl.
*G06K 9/00* (2006.01)
*G06F 16/583* (2019.01)
*H04N 5/232* (2006.01)
*G06F 16/29* (2019.01)

(52) U.S. Cl.
CPC ......... *G06K 9/00664* (2013.01); *G06F 16/29* (2019.01); *G06F 16/583* (2019.01); *H04N 5/232* (2013.01); *G06K 2209/27* (2013.01)

(58) Field of Classification Search
CPC .............. G06K 9/00664; G06F 17/30247
See application file for complete search history.

(56) References Cited

U.S. PATENT DOCUMENTS

| | | | |
|---|---|---|---|
| 9,536,049 B2 | 1/2017 | Brown et al. | |
| 2009/0030800 A1 | 1/2009 | Grois | |
| 2009/0177495 A1 | 7/2009 | Abousy et al. | |
| 2010/0017265 A1 | 1/2010 | Weingarten et al. | |
| 2014/0080428 A1 | 3/2014 | Rhoads et al. | |
| 2015/0130689 A1* | 5/2015 | Sugden | G02B 27/017 345/8 |
| 2016/0171387 A1 | 6/2016 | Suskind | |

(Continued)

OTHER PUBLICATIONS

Delaitre, Vincent., "Visual Chatbots to revolutionize interactions", https://blog.deepomatic.com/visual-chatbots-to-revolutionize-interactions-1f8693e27639, Aug. 9, 2016, 6 pages.

(Continued)

*Primary Examiner* — Ruiping Li

(57) ABSTRACT

Non-limiting examples of the present disclosure describe surfacing of contextual suggestions for image content within an applications/service, a non-limiting example of which is a camera application. Image content is captured through a camera application executing on a computing device. A determination of user intent is generated based on an analysis of a result of execution of image recognition processing on the image content and a result of an analysis of context for data associated with the image content. As an example, processing operations related to determining user intent may be executed by an intelligent personal assistant service that is executing on the computing device. One or more contextual suggestions for the image content are generated based on the determination of the user intent. The contextual suggestions for the image content are surfaced, for example, within the camera application or an accessory device connected with the computing device, among other examples.

20 Claims, 7 Drawing Sheets

(56) References Cited

U.S. PATENT DOCUMENTS

2018/0083898 A1* 3/2018 Pham .................. H04L 51/046

OTHER PUBLICATIONS

Samuely, Alex., "Why visual search?s next frontier could be chatbots, mobile concierges", http://www.mobilemarketer.com/ex/mobilemarketer/cms/news/search/22545.html, Mar. 31, 2016, 5 pages.

Osborne, Robin., "Virtual Shop Assistant Chatbot with Amazing Image Recognition", https://www.robinosborne.co.uk/2017/02/09/virtual-shop-assistant-chatbot-with-amazing-image-recognition/, Feb. 9, 2017, 46 pages.

Miller, Glenn., "AI, Machine Learning, NLP, and Deep Learning?", https://chatbotslife.com/ai-machine-learning-nlp-and-deep-learning-a4ae68ed221, Retrieved on: Apr. 3, 2017, 8 pages.

Jessica Conditt, "Google Lens is a Poweful, AI-Driven Visual Search App," Engadget, May 17, 2017, 1 page, https://www.engadget.com/2017/05/17/google-lens-brings-ai-understanding-to-assistant-and-photos/.

Dieter Bohn, "This is the Samsung Galaxy S8, Coming Apr. 21st," The Verge, Mar. 29, 2017, 1 page, https://www.theverge.com/2017/3/29/15087530/samsung-galaxy-s8-announced-features-release-date-video-specitications.

"International Search Report & Written Opinion Issued in PCT Application No. PCT/US2018/028738", dated Jul. 2, 2018, 10 Pages.

* cited by examiner

100

200

220

ADAPTED USER INTERFACE FOR SURFACING CONTEXTUAL ANALYSIS OF CONTENT

BACKGROUND

Our houses—our lives—are filled with things that need us to do something. Appliances that need servicing, insurance policies that need payment, medicines that need to be remembered and taken on a schedule, cars that need maintenance. Such things are frequently designated by arcane strings of numbers and letters representing the model number, account name, prescription number, and so on. Keeping track of all of this can be frustrating—just think of the last time you had to unplug your cable box so you can let customer support know the MAC address of your cable box. Another common issue occurs when users are in unfamiliar places and take a photo of something they appreciate but do not know what it is. For instance, a user may take a picture of unique architecture in foreign country and then have to go try and figure out what the subject is and the story behind it.

As such, examples of the present application are directed to the general technical environment related to adapting a user interface of an application/service to provide contextually relevant content within the application/service, among other examples.

SUMMARY

Non-limiting examples of the present disclosure describe surfacing of contextual suggestions for image content within an applications/service such as a camera application, photo library, social networking service, chat applications, intelligent personal assistant services, distributed/cloud-based services, etc. An application/service may be configured to generate exemplary contextual suggestions by utilizing resources associated with a suite of different application/services, for example, to enhance relevance of the contextual suggestions. In one example, a camera application may be configured to execute processing operations for generating and providing contextual suggestions. In another example, the camera application may interface with one or more other applications/services to receive generated contextual suggestions, for example, that may be surfaced in the camera application. For instance, an intelligent personal assistant service may collect and analyze signal data (e.g. associated with a user and a computing device), which may be utilized to generate contextually relevant suggestions for image content within the camera application. While a camera application is referenced, capture image content may refer to any image content including image content that is actively being viewed within the camera application (but not yet saved) as well as image content that is saved as a photo (within the camera application, photo album, social media applications, distributed network storages and associated services, etc.).

Image content may be captured through an application (e.g. camera application) that is executing on a computing device. A user intent is determined for the captured image content. As an example, a determination of user intent may comprise: executing image recognition processing on the image content and analyzing context of data associated with the image content. Examples of data associated with the image content may comprise metadata (including timestamp data, naming conventions, comments, etc.), collected signal data (e.g. from a user/user account or device(s)) as well as geo-locational data associated with the image content where geofencing processing may be executed for the image content. A determination of the user intent may be generated based on an analysis of a result of the executed image recognition processing and a result of an analysis of the context for the data associated with the image content. In further examples, the determination of user intent may be further generated based on executing processing of an audio signal that is captured, from a microphone of the computing device, proximate with the capturing of the image content. For instance, audio signals captured right before, during or right after the capturing of the image content may provide contextual clues that can be utilized to help determine the user intent. As an example, processing operations related to determining user intent may be executed by an intelligent personal assistant service, for example, that is executing on the computing device. In further examples, additional signal data such as device or user signal data (e.g. associated with a user of device/user account for the user) may be further utilized to enhance intent determination. For instance, sensor data from a device can be used to determine context that may assist in determining a most appropriate user intent at a given point in time. As an example, sensor data from a phone's gyroscope may be utilized to determine if user is running, can use heart rate sensor to determine exertion, etc.

One or more contextual suggestions for the image content may be generated based on the determination of the user intent. The contextual suggestions for the image content may be surfaced, for example, within the camera application. In one example, the contextual suggestions may be presented inline with the captured image content. In another example, the contextual suggestions are presented in a manner that overlays the captured image content. The contextual suggestions may be rich interactive content. In one instance, a selection of a contextual suggestion is received through the camera application. Access to additional content associated with a contextual suggestion may be provided based on the selection. The additional content, that is associated with the contextual suggestion, is presented within the camera application. In an alternative instance, the additional content associated with the contextual suggestion is presented in another application/service (e.g. a web browser application).

Moreover, processing operations described herein may further extend to examples that use an accessory device (connected with the computing device) to surface the captured image content and contextual suggestions. For instance, the accessory device may be an augmented reality (AR) hardware component that generates a virtual representation of the one or more contextual suggestions overlaying the captured image content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Examples described herein extend contextually relevant suggestions to a variety of modes of input including applications/services that capture image content, audio content, etc. For instance, a user can use the camera on their smartphone and the microphone as input, unlocking powerful new scenarios. In one example, if a user takes a photo of a medicine prescription, processing operations can be applied that determine what the prescription is and then offer to do related actions for it—order a refill, find additional info about the medicine, set up reminders for taking the medicine, etc. Examples described herein are more than just image recognition and also extend to other modes of input. For instance, users can use the microphone in their phones to capture music and go beyond simply recognizing the song—offering to find similar songs, show lyrics, see upcoming performance dates, etc. Additional extensibility of the present disclosure further goes beyond using a single computing device to provide contextual suggestions—for example, processing operations described herein are configured to extend to accessory devices such as augmented reality technologies, which may be utilized to recognize real world objects in real time and provide contextually relevant actions for the things the user sees and hears.

Accordingly, the present disclosure provides a plurality of technical advantages including but not limited to: real-time processing of content, adapting a user interface of an application/service to be configured to generate contextual suggestions for content in real-time, adapting a user interface of an application/service to be configured to surface contextual suggestions within the application/service, persisting, in a storage (e.g. distributed storage) contextual information for users and/or image content for enhancement of subsequent processing, extensibility to integrate different applications/services of a distributed network to enhance signal-based processing for generation of contextual suggestions in real-time, configurations that enable more efficient operation of processing devices (e.g., saving computing cycles/computing resources) in identifying a relevant context for content and generating/surfacing contextual suggestion and improving user interaction with an application/service including providing relevant contextual suggestions right within the application/service, among other examples.

Figure 1:
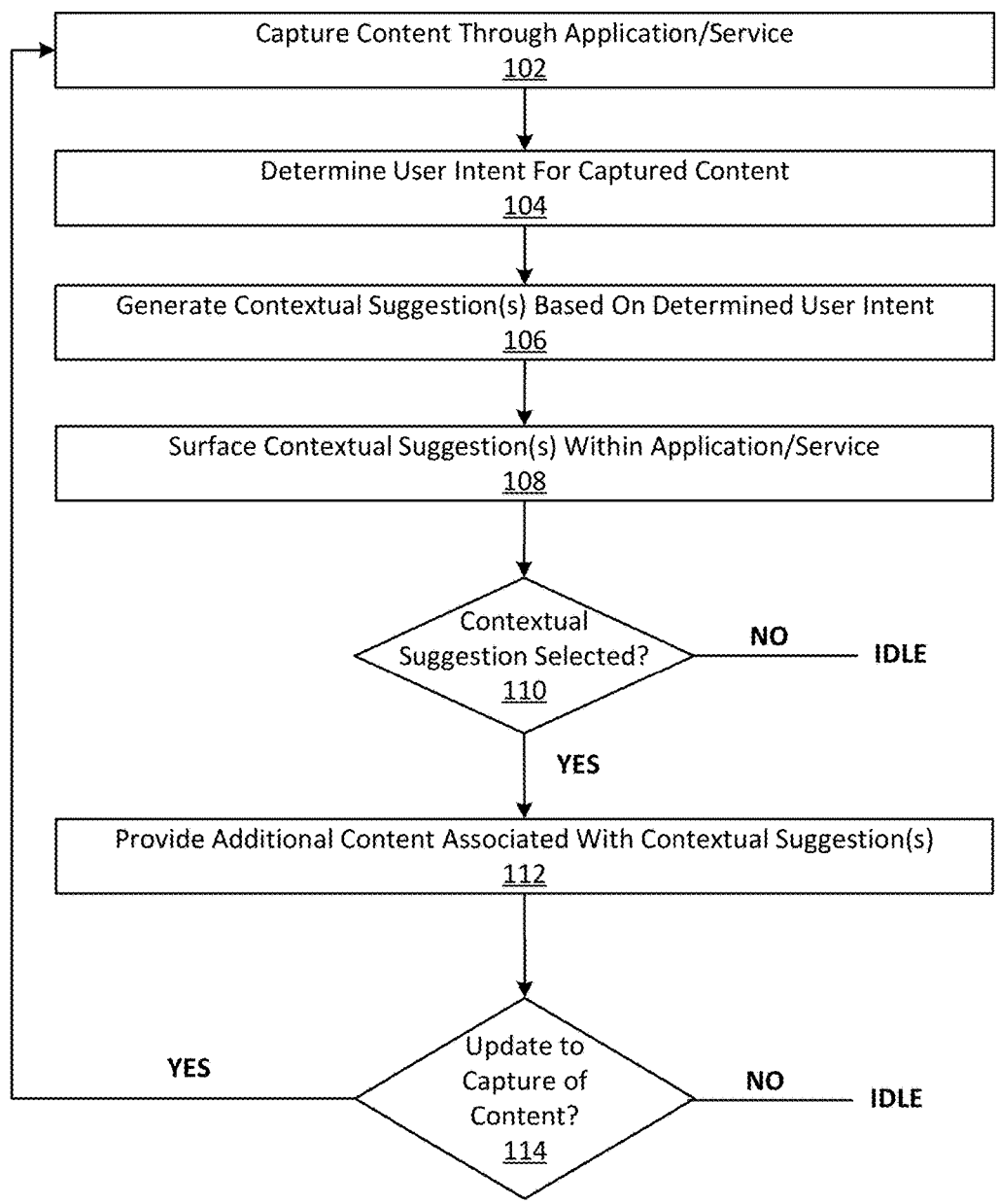
FIG. 1 illustrates an exemplary method related to contextual analysis of content with which aspects of the present disclosure may be practiced.

FIG. 1 illustrates an exemplary method 100 related to contextual analysis of content with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network, where a suite of applications/services may interface with an exemplary application through a distributed service accessed via network connection.

Method 100 begins at processing operation 102, where content may be captured through an application (e.g. camera application) that is executing on a computing device. Examples described herein can be configured to extend to any type of application/service and any type of content. Examples of content comprises but are not limited to any type of image content including image content that is associated with representations of other content (e.g. audio content, handwritten input, etc.). In one example, an application/service may be a camera application, photo library, social networking service, chat applications, intelligent personal assistant services, distributed/cloud-based services, etc., where content is image content. For ease of understanding, examples may reference that in which an exemplary application/service is a camera application. Image content may include content that is actively being viewed within the camera application (but not yet saved) as well as image content that is saved as a photo (within the camera application, photo album, social media applications, etc.). Examples of camera applications, photo management applications (e.g. photo libraries, camera rolls, etc.), presentation application (e.g. slideshow presentations), distributed storage services, etc. are known to one skilled in the art.

Flow may proceed to processing operation 104, where a user intent is determined for the captured image content. Determination (processing operation 104) of user intent may comprise an identification of subjects/entities within the image content as well as a probabilistic or predictive analysis of what the user's purpose/intention was when capturing the image content, for example, based available data retrieved and analyzed using one or more other applications/services of a platform (e.g. Microsoft® Office365®). Examples of such applications/services include but are not limited to: web search services, intelligent personal assistant services, input understanding services, knowledge databases and knowledge graphs (e.g. subject/entity identification), among other examples. In examples, analysis of user intent for the image content may comprise applying one or more input understanding models in coordination with knowledge repositories and/or knowledge graphs that evaluate semantic understanding, subject/entities, signal data (e.g. corresponding with users, computing devices, geo-locational signal data) etc. In one instance, an exemplary camera application may be configured to provide the captured image content to another application/service such as a web search engine service (e.g. Bing®) and/or an intelligent personal assistant service (e.g. Cortana®) for subsequent analysis. In another instance, an API may be configured to extend functionality of an exemplary camera application to execute a determination of user intent.

As an example, a determination of user intent may comprise executing image recognition processing on the image content. Image recognition processing is known to one skilled in the art and may comprise image, character, and sound recognition associated with capture of the image content. In at least one instance, a determination of user intent may comprise, when available, an analysis of an audio signal that is captured, from a microphone of the processing device, proximate with the capturing of the image content. For instance, audio signals captured right before, during or right after the capturing of the image content may provide contextual clues that can be utilized to help determine the user intent. In some instances, an exemplary computing device may be configured actively capture sound while a camera application is active and new image content is captured within the camera application (whether the image content is actually saved as a photo or not). It is to be understood that collecting of signal data from a user is done in compliance with privacy and regulatory laws that may include user consent to active such features.

Furthermore, processing operation 104 may comprise executing contextual analysis of data associated with the image content. Examples of data associated with the image content may comprise metadata (including timestamp data, naming conventions, comments, etc.), collected signal data (e.g. from a user/user account or device(s)) as well as geo-locational data associated with the image content where geofencing processing may be executed for the image content. Processing operations for analyzing context associated with data of the image content is known to one skilled in the art. Geo-fencing processing as well as processing operations for the collection and analysis of geo-locational signal data (e.g. collected through geo-fencing) are known to one skilled in the art. Knowing the location where photos are taken or sounds captured provide helpful cues in inferring user intent. This may be useful when combined with analysis of user signal data, for example, to identify that a user is in a specific location such as the home of the user or even a specific room of their home (e.g. kitchen). In another instance, it may be identified that a user is traveling to a foreign country and capturing a photo of a historic landmark in that country.

As an example, processing operations related to determining user intent may be executed by an intelligent personal assistant service, for example, that is executing on the computing device. In one example, determining (processing operation 104) user intent may occur based on an analysis of at least a result of the executed image recognition processing and a result of contextual analysis of data associated with the executed geo-fencing processing. Processing operation 104 may further comprise analyzing collected data as well as other signal data associated with a user (e.g. user account, application/service usage of a user account across a suite of applications of a platform, one or more computing devices of the user, etc.) to generate a determination of user intent. In further examples, other contextual information may be collected and analyzed to assist with determining user intent. For example, additional signal data such as device signal data or user signal data (e.g. associated with a user of device/user account for the user) may be further utilized to enhance intent determination. In one instance, sensor data from a device can be used to determine context that may assist in determining a most appropriate user intent at a given point in time. As an example, sensor data from a phone's gyroscope may be utilized to determine if user is running, can use heart rate sensor to determine exertion, etc. Other examples of signal data may comprise signals received from accessory devices (e.g. heartrate monitor, sleep monitor, fitness tracking devices and other wearable accessory devices (e.g. watches). Additional data such as metadata associated with an image such as timestamp data, naming conventions, etc. may also be analyzed to assist with determining user intent and/or context for image content.

Furthermore, processing operation 104 may further comprise accessing stored contextual information for a user and/or device, for example, that may have been previously persisted to assist with subsequent determinations of user intent. Contextual information and signal data collected and analyzed over time can be persisted to memory and saved for later user. In one example, specific contextual information and/or results of analyzing such information can be saved to a distributed network service (e.g. cloud based service) or application to assist with making a most appropriate determination of user intent. Persisted storage may be updated in real-time with new signal data and analysis results thereof. For instance, if it is determined that a refrigerator a user was looking at in Home Depot® is now at the house of the user, a determination can be made that categorizes that model refrigerator as the user's home refrigerator. If the user makes a query asking for a replacement water filter, processing operations executed by a service can understand that the user is referring to the home refrigerator and can provide contextual suggestions to assist with ordering the appropriate replacement part (e.g. specific water filter for the home refrigerator).

Flow may proceed to processing operation 106, where one or more contextual suggestions for the image content may be generated based on the determination of the user intent. Processing operations for retrieving data and generating contextual suggestions based on a determined user intent are known to one skilled in the art. For instance, services such as web search services, intelligent personal assistant services, social networking services, etc.) may be utilized to generate contextual suggestions based on entity identification and predicted intent for a user regarding the image content. An exemplary application/service (e.g. camera application) may be configured to generate contextual suggestions or another service (e.g. intelligent personal assistant service) may be configured to generate the contextual suggestions. In examples where contextual suggestions are generated by an application/service other than that in which the image content is captured, the exemplary application (e.g. camera application) may be configured to interface with other application/services to receive the generated contextual suggestions.

Figure 2A:
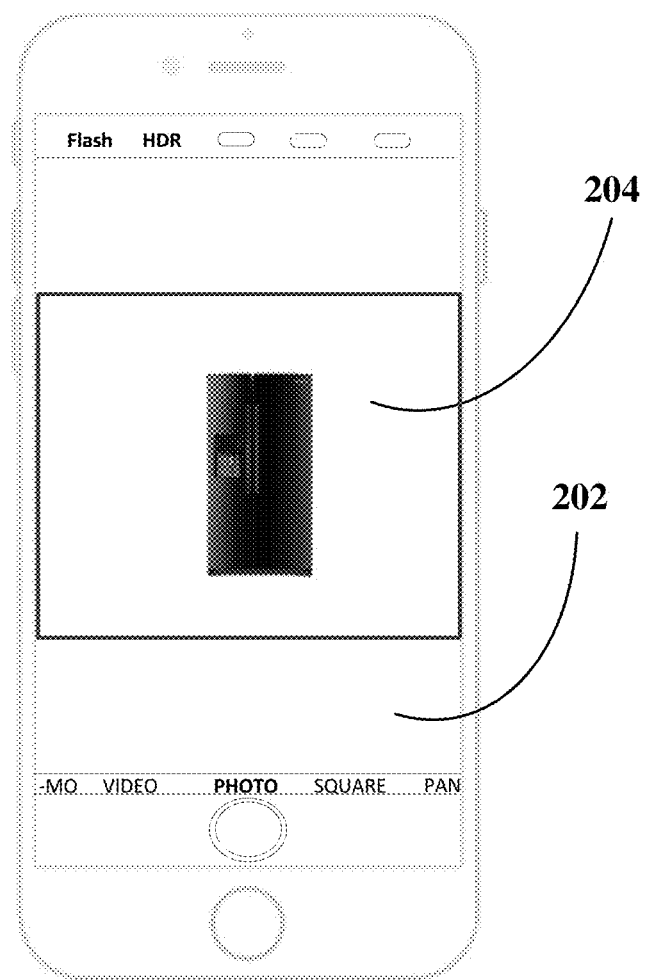
FIGS. 2A and 2B illustrate exemplary processing device views providing examples related to generation and surfacing of exemplary contextual suggestions with which aspects of the present disclosure may be practiced.
Figure 2B:
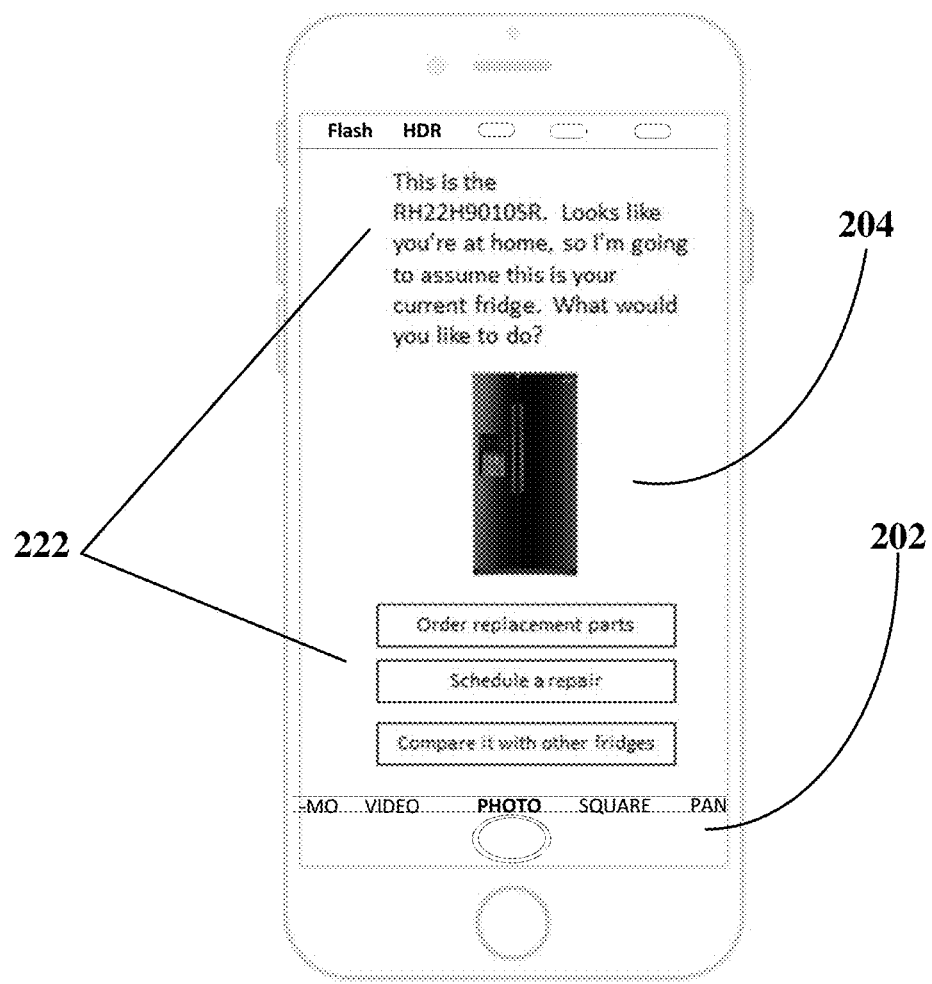

At processing operation 108, generated contextual suggestions may be surfaced, for example, within the camera application. That is, a user interface of application/service displaying the captured image content may be adapted to enable contextual suggestions to be surfaced directly within the application. In one example, the contextual suggestions may be presented inline with the captured image content. In another example, the one or more contextual suggestions are presented in a manner that overlays the captured image content. Refer to FIGS. 2A and 2B and the accompanying description for a non-limiting visual example of surfacing of exemplary contextual suggestions. The contextual suggestions may be rich interactive content, for example, where a user may be able to select and view additional content associated with a selected contextual suggestion.

Moreover, processing operations described herein (e.g. processing operation 108) may further extend to examples that use an accessory device (connected with the computing device) to surface the captured image content and contextual suggestions. For instance, the accessory device may be an augmented reality (AR) hardware component that generates a virtual representation of the one or more contextual suggestions overlaying the captured image content. In some instances, a representation of the contextual suggestions may be surfaced in both a primary computing device (e.g. within the camera application) as well as another representation being simultaneously surfaced through an accessory device (or display connected with an accessory device).

Flow may proceed to decision operation 110, where the user interface of the exemplary application/service is configured to detect whether input is received for selection of a contextual suggestion. In examples where a contextual suggestion is not selected, flow of method 100 branches NO and processing remains idle. In some instances, telemetric data related to non-selection of surfaced contextual suggestions may be reported back to a service, for example, to further assist learning when making user intent determinations. In some other examples, the user interface of the exemplary application may be further adapted to provide new user interface features that help collect such telemetric data for subsequent generation of contextual suggestions.

If it is determined (in decision operation 110) that a selection is made for a contextual suggestion, flow of method 100 branches YES and proceeds to processing operation 112. At processing operation 112, additional content associated with the contextual suggestion is provided. That is, access to additional content associated with the contextual suggestion may be provided based on the received selection. In one example, the additional content, that is associated with the contextual suggestion, is presented within the camera application. In an alternative instance, the additional content associated with the contextual suggestion is presented in another application/service (e.g. a web browser application).

Flow of method 100 may next proceed to decision operation 114, where it is determined whether there is an update to the captured content. In examples where no update occurs to the captured content, flow of method 100 branches NO and processing remains idle. In examples where an update to the captured content is detected, flow of method 100 branches YES and processing returns to processing operation 102. For instance, a user may elect to take another picture or identify that contextual suggestions do not match their actual intent.

In further examples, the adapted user interface of an exemplary application/service may be configured to enable users to save a representation of captured image content that also comprises the contextual suggestions. For example, a user may wish to reference the image and contextual suggestions at a later point in time or share such a representation with other users.

FIGS. 2A and 2B illustrate exemplary processing device views providing examples related to generation and surfacing of exemplary contextual suggestions with which aspects of the present disclosure may be practiced. Processing operations described for generation and management of exemplary contextual suggestions are described in at least the foregoing description of method 100 (FIG. 1).

FIG. 2A illustrates processing device view 200, which is a user interface example of an application/service (e.g. camera application) executing on a computing device. In processing device view 200, a camera application 202 is executing on the computing device, where the camera application 202 is displayed captured image content 204. As can be seen in processing device 200, the captured image content 204 is a refrigerator. For instance, a user may be taking a picture of a refrigerator at a specific location (e.g. in their home, at a store, at a friends' house, etc.), where recognition processing and determination of a user intent may be utilized to generate contextual suggestions for the captured image content 204.

FIG. 2B illustrates processing device view 220, which is another user interface example of an application/service (e.g. camera application) executing on a computing device. Processing device view 220 builds on the example shown in processing device view 200 (FIG. 2A), where contextual suggestions are displayed for the captured image content 204. Processing operations for analysis of captured image content and generation/surfacing of contextual suggestions have been described in the foregoing description of method 100 (FIG. 1). As an example, the contextual suggestions 222 for the captured image content 204 (e.g. refrigerator) comprise suggestions that identify a specific model number, brand, etc., for the refrigerator. This may be useful if the user is unaware of such information or that information is not readily visible to the user (e.g. on the back of the refrigerator when the refrigerator is up against a wall). The contextual suggestions 222 further comprise selectable user interface features that may enable to immediately take action based on the captured image content 204. As described in the foregoing, other types of contextual suggestions may be generated where specificity of the contextual suggestions may depend on the signal data collected.

Figure 3:
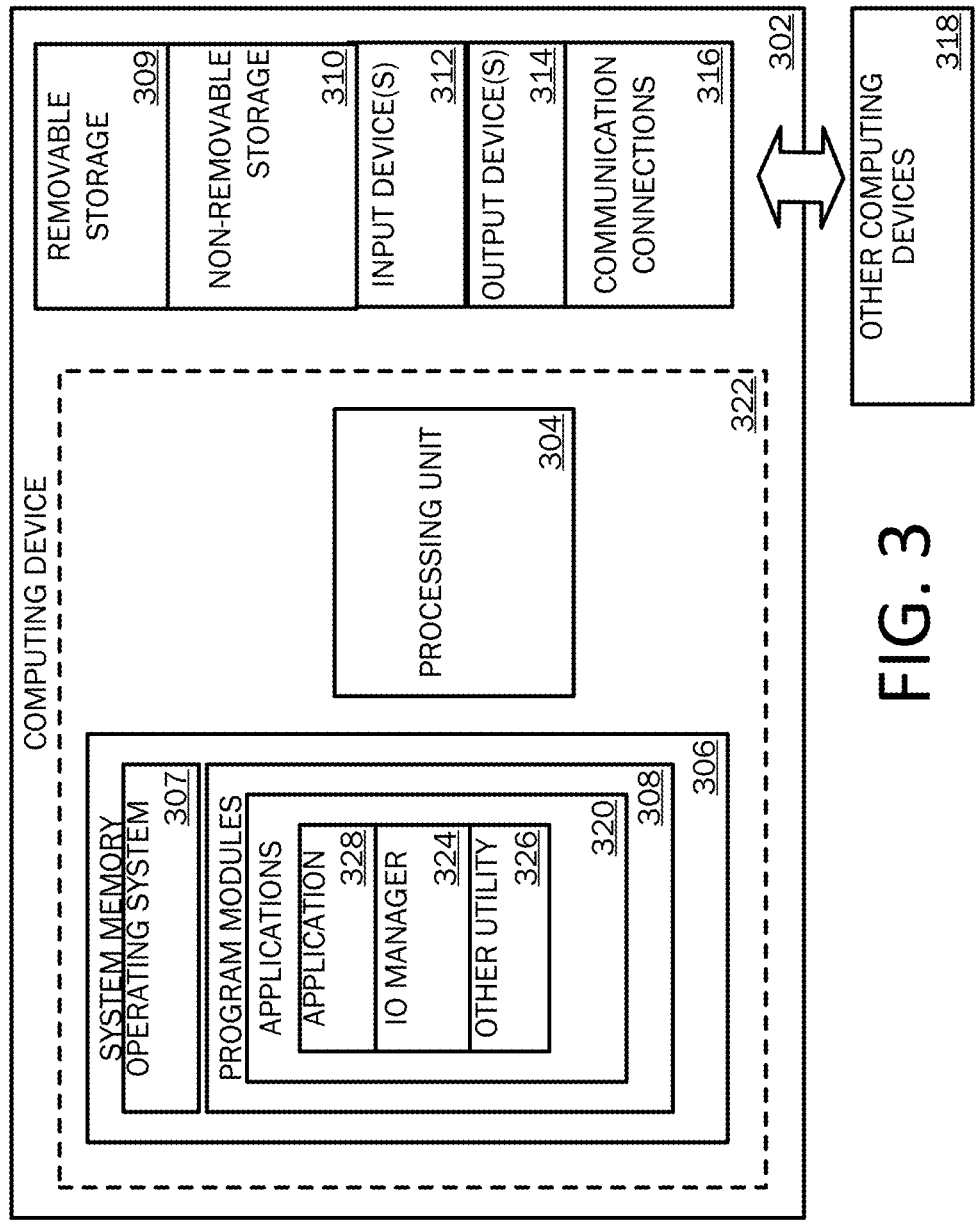
FIG. 3 is a block diagram illustrating an example of a computing device with which aspects of the present disclosure may be practiced.
Figure 4A:
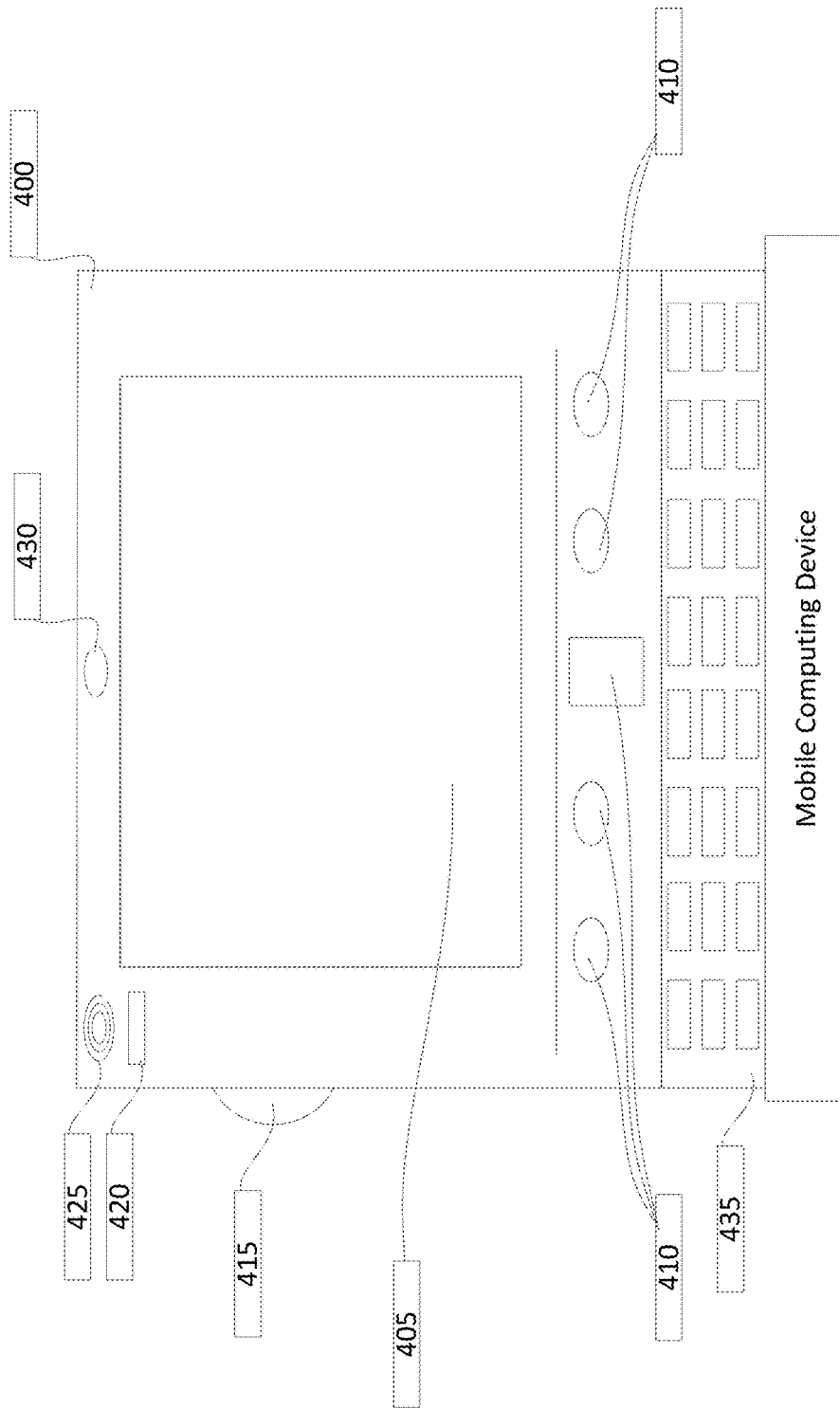
FIGS. 4A and 4B are simplified block diagrams of a mobile computing device with which aspects of the present disclosure may be practiced.
Figure 4B:
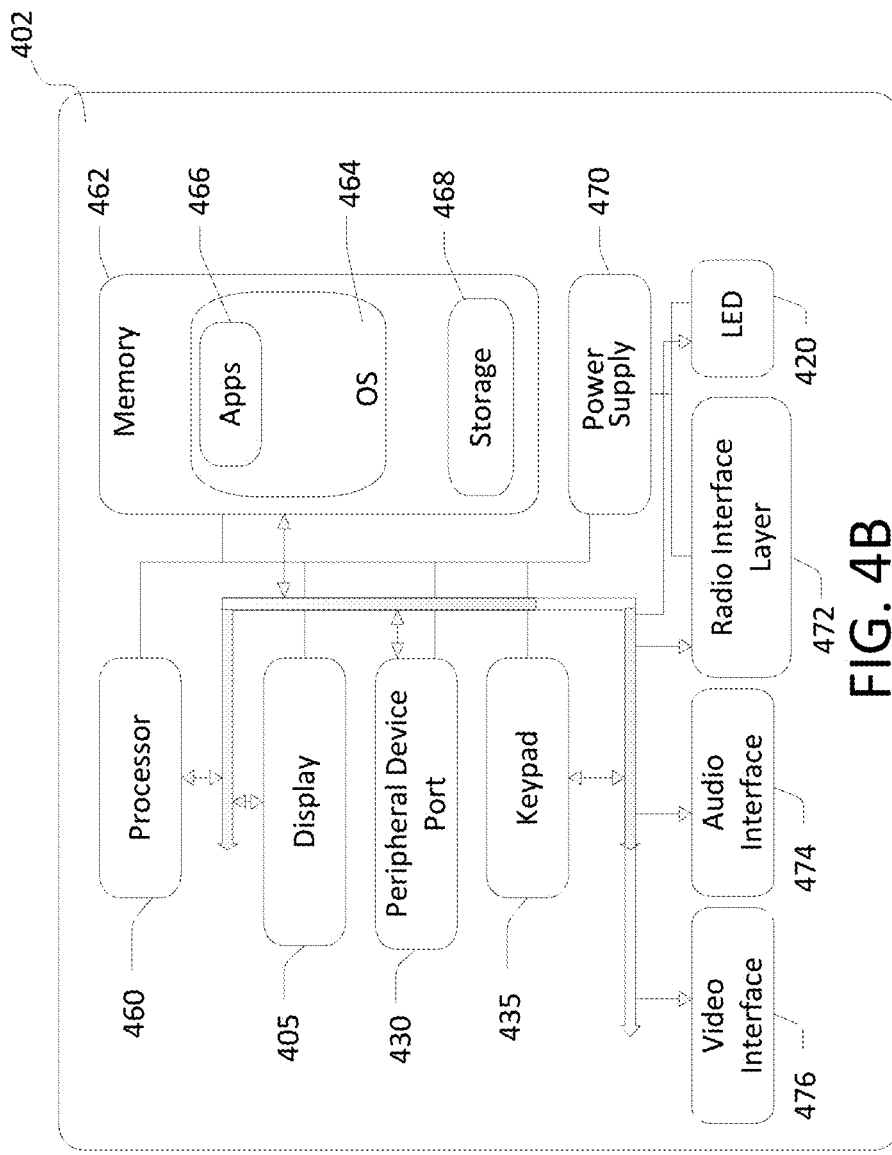
Figure 5:
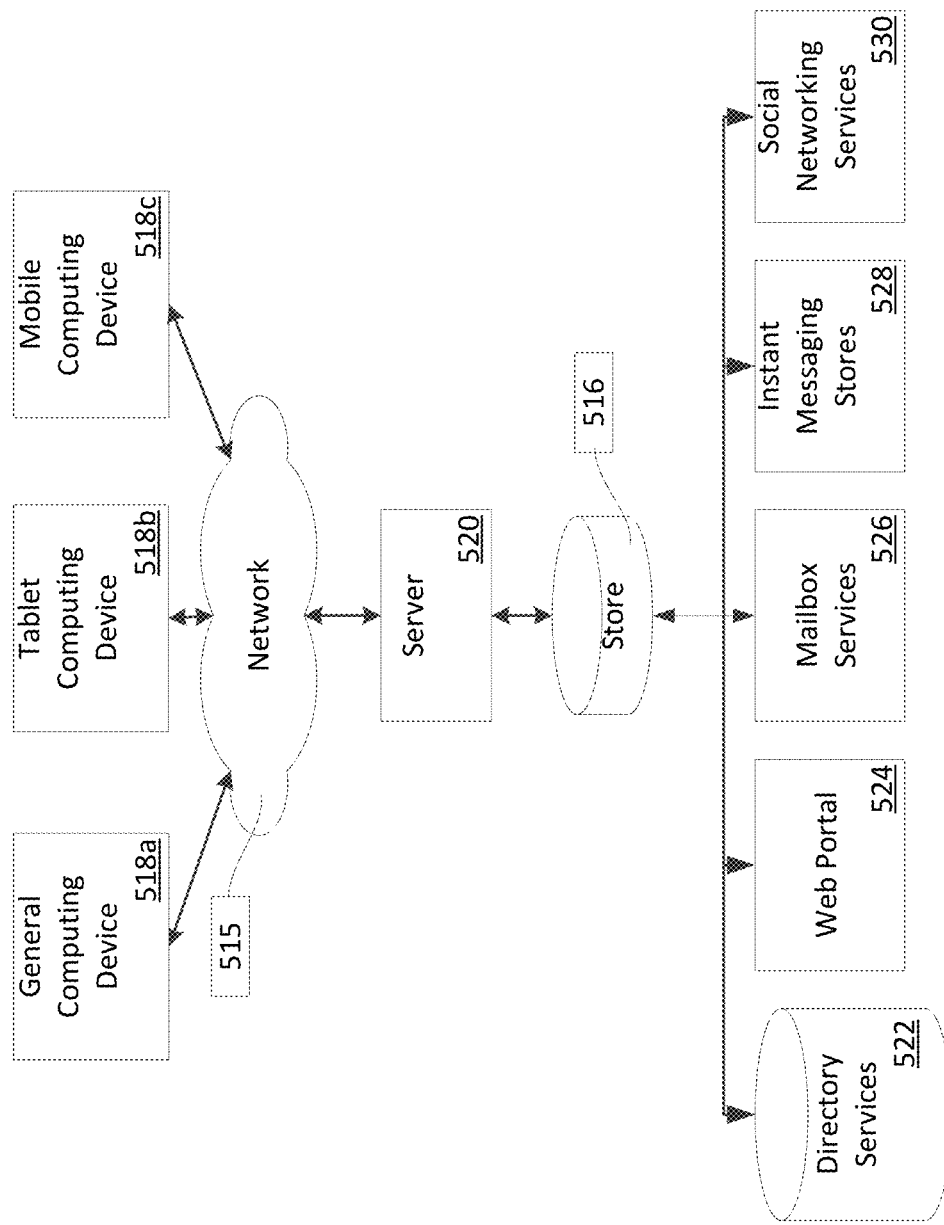
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for processing operations related to analysis of content and generation/surfacing of exemplary contextual suggestions as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 409 and a non-removable storage device 310.

As stated above, a number of program modules and data files may be stored in the system memory 306. While executing on the processing unit 404, program modules 408 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 404 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for processing operations related to analysis of content and generation/surfacing of exemplary contextual suggestions as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for processing operations related to analysis of content and generation/surfacing of exemplary contextual suggestions as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
accessing, via an application executing on a computing device, stored image content;
receiving a user selection of the stored image content for display;
displaying, based on the received user selection, the stored image content in a user interface of the application;
determining user intent for the stored image content based on:
executing image recognition processing on the stored image content,
analyzing context for data associated with the stored image content including executing geofencing processing for the stored image content, and
generating a determination of the user intent based on an analysis of a result of the executed image recognition processing and a result of an analysis of the context for the data associated with the stored image content;
generating one or more contextual suggestions for the stored image content based on the determination of the user intent; and
surfacing, as part of the user interface of the application, the one or more contextual suggestions along with the stored image content.

2. The method of claim 1, wherein the user intent for the stored image content is further determined based on executing processing of an audio signal that is captured, from a microphone of the computing device, proximate with the displaying of the stored image content.

3. The method of claim 1, wherein the surfacing presents the stored image content and the one or more contextual suggestions using an accessory device connected with the computing device.

4. The method of claim 3, wherein the accessory device is an augmented reality (AR) hardware component that generates a virtual representation of the one or more contextual suggestions overlaying the stored image content.

5. A system comprising:
at least one processor; and
a memory, operatively connected with the at least one processor, storing computer-executable instructions that, when executed by the at least one processor, causes the at least one processor to execute a method that comprises:
accessing, via an application executing on the system, stored image content;
receiving a user selection of the stored image content for display;
displaying, based on the received user selection, the stored image content in a user interface of the application;
determining user intent for the stored image content based on:
executing image recognition processing on the stored image content,
analyzing context for data associated with the stored image content including executing geofencing processing for the stored image content, and
generating a determination of the user intent based on an analysis of a result of the executed image recognition processing and a result of an analysis of the context for the data associated with the stored image content;
generating one or more contextual suggestions for the stored image content based on the determination of the user intent; and
surfacing, as part of the user interface of the application, the one or more contextual suggestions along with the stored image content.

6. The system of claim 5, wherein the user intent for the stored image content is further determined based on executing processing of an audio signal that is captured, from a microphone of the computing device, proximate with the displaying of the stored image content.

7. The system of claim 5, wherein the surfacing presents the stored image content and the one or more contextual suggestions using an accessory device connected with the computing device.

8. The system of claim 7, wherein the accessory device is an augmented reality (AR) hardware component that generates a virtual representation of the one or more contextual suggestions overlaying the stored image content.

9. A computer-readable medium storing computer-executable instructions that, when executed by at least one processor, causes the at least one processor to execute a method comprising:
accessing, via an application executing on a computing device, stored image content;
receiving a user selection of the stored image content for display;
displaying, based on the received user selection, the stored image content in a user interface of the application;
determining user intent for the stored image content based on:
executing image recognition processing on the stored image content,
analyzing context for data associated with the stored image content including executing geofencing processing for the stored image content, and
generating a determination of the user intent based on an analysis of a result of the executed image recognition processing and a result of an analysis of the context for the data associated with the stored image content;

generating one or more contextual suggestions for the stored image content based on the determination of the user intent; and surfacing, as part of the user interface of the application, the one or more contextual suggestions along with the stored image content.

10. The method of claim 1, wherein an analysis of the context for data comprises comparing a geo-fencing result for the stored image content with a geo-fencing result of other image content, wherein the context comprises a designation for an object in the stored image content based on a result of the comparing, and wherein the one or more contextual suggestions comprise a suggested action to execute based on the designation of the object.

11. The method of claim 1, wherein an analysis of the context for data comprises comparing a geo-fencing result for the stored image content with a geo-fencing result of other image content, wherein the context comprises a determination that an object in the stored image content has changed locations, and wherein the one or more contextual suggestions comprise a suggested action to execute based on the determination that the object has changed locations.

12. The method of claim 1, wherein an analysis of the context for data comprises correlating an item in the stored image content with a search query being executed through the computing device, and wherein the one or more contextual suggestions comprise one or more of: a suggested action to execute based on a correlation of the item with the search query, and a search result based on the correlation of the item with the search query.

13. The method of claim 1, wherein the accessing of the stored image content comprises a selection, through the computing device, of the stored image content from a user-specific distributed storage.

14. The system of claim 5, wherein an analysis of the context for data comprises comparing a geo-fencing result for the stored image content with a geo-fencing result of other image content, wherein the context comprises a designation for an object in the stored image content based on a result of the comparing, and wherein the one or more contextual suggestions comprise a suggested action to execute based on the designation of the object.

15. The system of claim 5, wherein an analysis of the context for data comprises comparing a geo-fencing result for the stored image content with a geo-fencing result of other image content, wherein the context comprises a determination that an object in the stored image content has changed locations, and wherein the one or more contextual suggestions comprise a suggested action to execute based on the determination that the object has changed locations.

16. The system of claim 5, wherein an analysis of the context for data comprises correlating an item in the stored image content with a search query being executed through the computing device, and wherein the one or more contextual suggestions comprise one or more of: a suggested action to execute based on a correlation of the item with the search query, and a search result based on the correlation of the item with the search query.

17. The system of claim 5, wherein the accessing of the stored image content comprises a selection, through the computing device, of the stored image content from a user-specific distributed storage.

18. The computer-readable medium of claim 9, wherein an analysis of the context for data comprises comparing a geo-fencing result for the stored image content with a geo-fencing result of other image content, wherein the context comprises a designation for an object in the stored image content based on a result of the comparing, and wherein the one or more contextual suggestions comprise a suggested action to execute based on the designation of the object.

19. The computer-readable medium of claim 9, wherein an analysis of the context for data comprises comparing a geo-fencing result for the stored image content with a geo-fencing result of other image content, wherein the context comprises a determination that an object in the stored image content has changed locations, and wherein the one or more contextual suggestions comprise a suggested action to execute based on the determination that the object has changed locations.

20. The computer-readable medium of claim 9, wherein an analysis of the context for data comprises correlating an item in the stored image content with a search query being executed through the computing device, and wherein the one or more contextual suggestions comprise one or more of: a suggested action to execute based on a correlation of the item with the search query, and a search result based on the correlation of the item with the search query.

* * * * *